United States Patent [19]

Gillies

[11] 4,346,673
[45] Aug. 31, 1982

[54] APPARATUS AND METHOD FOR METERING AND CONTROLLING A FEED OF HYDROGEN FLUORIDE VAPOR

[75] Inventor: George M. Gillies, St. Annes, England

[73] Assignee: British Nuclear Fuels Limited, Warrington, England

[21] Appl. No.: 168,011

[22] Filed: Jul. 14, 1980

[30] Foreign Application Priority Data

Jul. 23, 1979 [GB] United Kingdom ................. 7925564

[51] Int. Cl.$^3$ ............................................... F22B 1/02
[52] U.S. Cl. .................................. 122/31 R; 122/32; 122/33; 237/8 R
[58] Field of Search ............................. 122/8, 32–34, 122/36, 31 R, 31 A; 237/8 R

[56] References Cited

U.S. PATENT DOCUMENTS

| | | | |
|---|---|---|---|
| 1,681,305 | 8/1928 | Moneuse | 122/32 |
| 2,007,426 | 7/1935 | Harris | 122/32 |
| 2,904,014 | 9/1959 | Meyers | 122/33 |
| 3,237,608 | 3/1966 | Brandl | 122/33 |
| 3,249,303 | 5/1966 | Townsend | 237/8 R |
| 3,967,591 | 7/1976 | Iida | 122/32 |
| 4,148,281 | 4/1979 | Stoll et al. | 122/32 |

*Primary Examiner*—Henry C. Yuen
*Attorney, Agent, or Firm*—William R. Hinds

[57] ABSTRACT

A boiler for vaporizing liquid hydrogen fluoride has a heat transfer surface arranged to be covered increasingly by the liquid as the liquid level rises so that the heat supplied to the boiler can be adjusted to maintain a constant level of liquid in the boiler and thereby equate the feed rate of liquid hydrogen fluoride to that vaporized. Thus by metering and controlling the feed rate of the liquid the feed rate of the vapor can be metered and controlled.

4 Claims, 3 Drawing Figures

APPARATUS AND METHOD FOR METERING AND CONTROLLING A FEED OF HYDROGEN FLUORIDE VAPOR

BACKGROUND OF THE INVENTION

This invention relates to apparatus and method for metering and controlling a feed of hydrogen fluoride vapour to a chemical plant.

Statement of the Invention

According to the present invention apparatus for metering and controlling a feed of hydrogen fluoride vapour to a chemical plant comprises a boiler for vaporising substantially anhydrous liquid hydrogen fluoride having an inlet for the liquid hydrogen fluoride and an outlet for hydrogen fluoride vapour, a feed line including a control valve and a flowmeter for the liquid hydrogen fluoride, for connecting a source of substantially anhydrous liquid hydrogen fluoride with the boiler inlet, a heat transfer surface within the boiler arranged to be increasingly covered by the liquid hydrogen fluoride as the level of the liquid hydrogen fluoride rises in the boiler and means for supplying heat to the heat transfer surface.

The supply of heat to the heat transfer surface is so arranged that it is the amount of heat transfer surface covered by the liquid which controls the supply of heat to the liquid hydrogen fluoride in the boiler. With any specified feed rate an equilibrium can then be set up, the area of heat transfer surface covered by the liquid hydrogen fluoride determining the rate of boil-off of hydrogen fluoride vapour, and the rate of boil-off equalling the rate of feed of liquid hydrogen fluoride, so that the liquid level in the boiler is maintained at a substantially constant level. By means of the invention, therefore, a supply of hydrogen fluoride vapour to a reaction vessel may be metered by metering the liquid phase from which the vapour is derived. This is an advantage because the sensitivity of hydrogen fluoride vapour to changes in temperature and pressure affects the accuracy with which a flow of hydrogen fluoride can be metered in the vapour phase.

The heat supply and the heat transfer surface are both conveniently provided by a steam jacket for the boiler. The size of the steam jacket may be varied to vary the limits of the feed rate for a particular boiler. Means are preferably provided for maintaining the steam pressure in the jacket at a constant value.

To obtain a metered supply of hydrogen fluoride vapour by means of the invention it has been found in practice necessary to evaporate it from substantially anhydrous liquid hydrogen fluoride, that is to say, the liquid normally available commercially as "anhydrous hydrogen fluoride" and containing less than 2% by weight of water. When used herein the term "substantially anhydrous liquid hydrogen fluoride" or "AHF" should be so understood.

Also in accordance with the invention, a method of producing a metered feed of hydrogen fluoride vapor, using apparatus as described herein, comprises metering a feed of liquid hydrogen fluoride, introducing the metered feed into the boiler, supplying heat to the boiler through the heat transfer surface, and maintaining the size and location of the heat transfer surface such that liquid hydrogen fluoride is maintained in the boiler at a level partially covering the surface and the metered liquid flow rate is balanced in equilibrium by the rate of evaporation of the liquid hydrogen fluoride and any departure from said level will be automatically restored. The method may further include determining the required feed rate of hydrogen fluoride vapor, comparing it with the metered feed rate of liquid hydrogen fluoride, and varying the feed rate of liquid hydrogen fluoride appropriately to have it correspond with the required flow of hydrogen fluoride vapor.

DESCRIPTION OF THE DRAWINGS

The invention will now be described by way of example with reference to the accompanying drawings wherein.

DESCRIPTION OF THE PREFERRED EMBODIMENT

Figure 1:
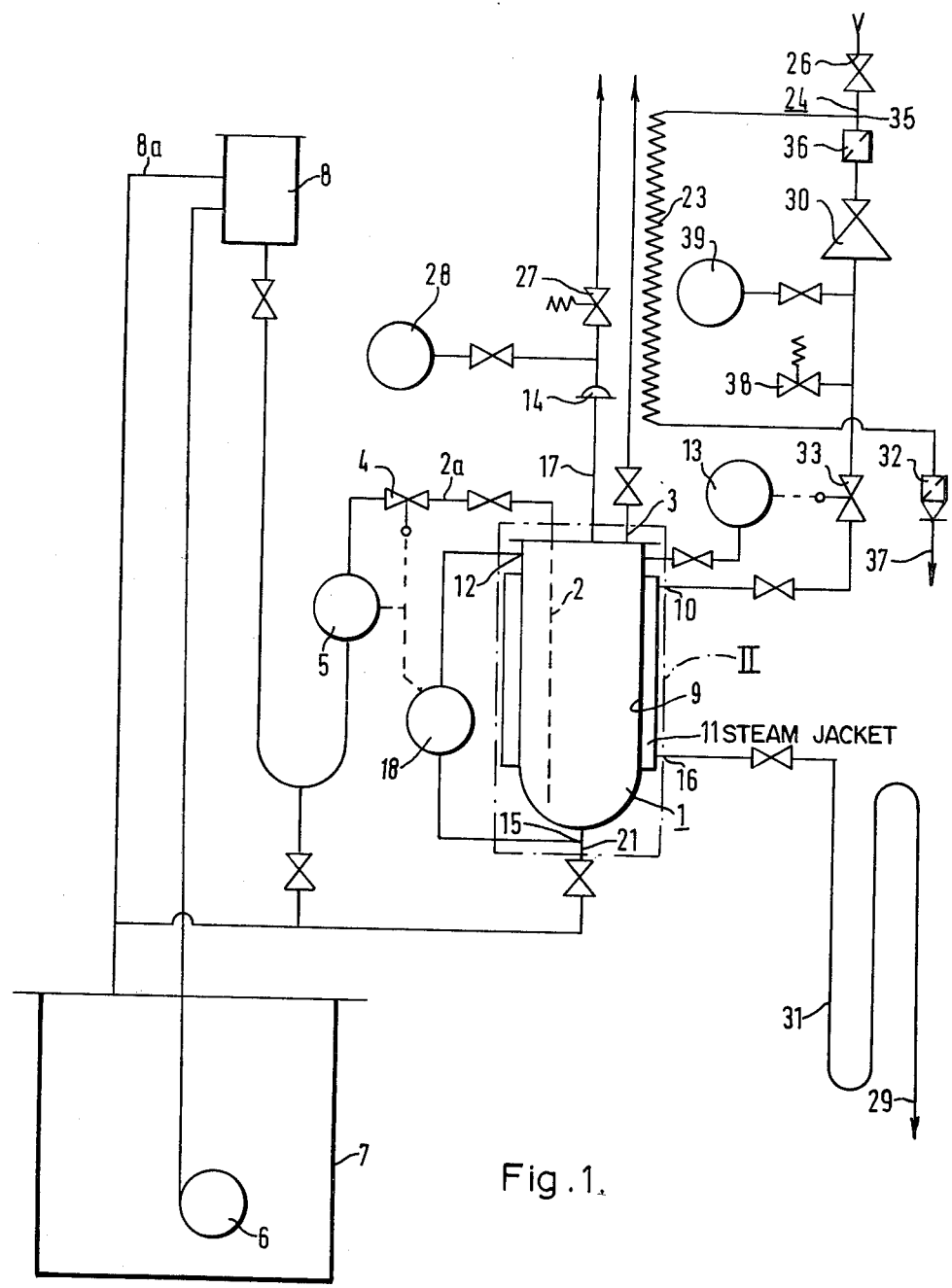
FIG. 1 is a diagram including apparatus in accordance with the invention.

FIG. 1 of the drawings shows a boiler 1 having an inlet 2 leading to the bottom of the boiler and an outlet line 3. A feed line 2a including a control valve 4 and a flow recording controller 5 connects the inlet 2 with a header tank 8. AHF can be pumped from a storage tank 7 to the header tank 8 by a pump 6. The header tank 8 is provided with an overflow 8a whereby a constant head of the liquid AHF may be maintained in the header tank.

Figure 3:
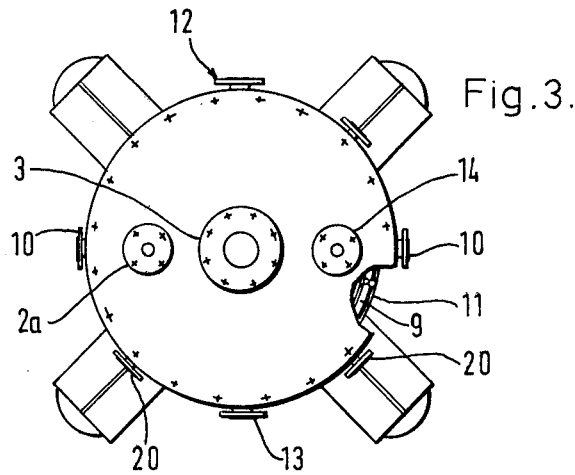
FIG. 3 is an end view of the boiler of FIG. 2 in the direction of the arrow III.
Figure 2:
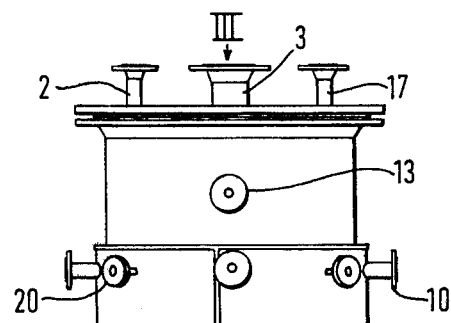
FIG. 2 is a side view of the boiler shown within the dotted frame II of FIG. 1

The boiler 1 is shaped to provide a heat transfer surface 9 which is surrounded by a steam jacket 11 for supplying heat to the surface 9. As is shown more clearly in FIGS. 2 and 3 the heat transfer surface 9 forms the inner wall of the steam jacket 11. The steam jacket is made in three equal parts each extending around one third of the circumference of the heat transfer surface 9 and each is provided with a steam inlet 10, a condensate outlet 16 and a vent 20. The boiler is mounted on struts 22 and has a bottom drain 21.

Tapping points 12 and 15 for a level recorder 18 are provided on the boiler. This recorder is fitted with high and low level alarms. The high level alarm closes the valve 4. A pressure recorder 13 fitted with a high level alarm is connected at the top of the boiler. Also connected to the top of the boiler is an emergency vent line 17 leading to an emergency scrubber unit (not shown). This line carries a bursting disc 14 and a pressure relief valve 27 set to vent at a pressure below the safe working pressure of the boiler. A pressure indicator 28 is connected between the bursting disc and the pressure relief valve to enable the state of the bursting disc to be checked.

Referring now to the steam circuit, a low pressure steam feed circuit 24 controlled by a valve 26 is divided at junction 35. One part of the circuit includes a superheater 23 for hydrogen fluoride vapour in the boiler outlet line 3 and a steam trap 32 leading to a drain 37. The other part of the circuit includes a filter 36 to remove grit, a pressure controller 30, a pressure gauge 39 and a pressure relief valve 38, also a cut-off valve 33 for the inlets 10 of the steam jacket 11, which can be operated by the high level alarm of the pressure recorder 13. Condensate outlet lines 16 from the steam jacket 11 include a pressure regulation manometer 31 which leads to a drain 29.

In operation AHF is pumped from the storage tank 7 to the header tank 8. The flow recording controller 5 measures the flow through line 2a, compares it with the required flow and adjusts the control valve 4 accordingly. The inlet line 2 dips to the bottom of the boiler so that the cool liquid inlet will not prevent a steady vapourisation from the surface of the liquid.

Steam is passed to the steam jacket 11 from the circuit 24 and heat is transferred through the heat transfer surface 9 to vapourise the AHF in the boiler 1. As the AHF liquid level in the boiler rises, more and more heat is transferred to the liquid until a steady state is reached when liquid is vapourising from the surface (and vapour is passing out through the outlet line 3) at the same rate as liquid is being replaced through the inlet 2. Condensate leaves the jacket 11 through the outlets 16. The three equal parts of the steam jacket 11, each with independent inlets 10, outlets 16 and vents 20 allow the heat capacity of the boiler to be varied since the closing of one set or, alternatively, two sets of the inlet and outlet valves 10 and 16 changes the area of heat transfer surface 9 in use and hence the ratio of heat transfer surface to AHF volume in the boiler.

The low pressure steam supply via valve 26 splits into two at junction 35. The first supply is used to super-heat the hydrogen fluoride leaving the outlet 3 from the boiler 1 before passing on to the chemical plant as reacting fluid. (The hydrogen fluoride leaving the boiler at 3 is saturated i.e. it is in equilibrium with liquid AHF). The condensate leaving the super heater is removed by the steam trap 32 to drain 37. The second supply to the steam jacket 11 is first filtered at 36 to remove grit then passed through the pressure controller 30.

I claim:

1. Apparatus for metering and controlling a feed of hydrogen fluoride vapour to a chemical plant, said apparatus comprising a boiler for vaporising substantially anhydrous liquid hydrogen fluoride, having an inlet for the liquid hydrogen fluoride and an outlet for hydrogen fluoride vapour, a feed line including a control valve and a flow meter for the liquid hydrogen fluoride for connecting a source of substantially anhydrous liquid hydrogen fluoride with the boiler inlet, a heat transfer surface within the boiler arranged to be increasingly covered by the liquid hydrogen fluoride as the level of the liquid hydrogen fluoride rises in the boiler and having dimensions related to the flow rate of liquid hydrogen fluoride so that for any given liquid flow rate within predetermined limits a liquid level will be automatically established at which heat transfer through the liquid-covered heat transfer surface is such that hydrogen fluoride will boil off at a rate equal to the liquid flow rate, and thus the metered liquid flow rate will indicate the feed rate of hydrogen fluoride vapour to the plant, and means for supplying heat to the heat transfer surface above and below the liquid level such that the evaporation rate is determined essentially only by the amount of heat transfer surface covered by the liquid, and hence by the liquid level in the boiler, said heat transfer surface and said means for supplying heat to the heat transfer surface being provided by a steam jacket, and means for varying laterally the size of the heated steam jacket to vary the liquid flow limits that can be handled by the apparatus.

2. Apparatus as claimed in claim 1 wherein said means for varying the size of the heated steam jacket comprises means dividing the steam jacket into at least three horizontally adjacent portions, each portion having its own inlet and outlet for steam.

3. A method of producing a metered feed of hydrogen fluoride vapour utilizing apparatus comprising a boiler for vaporising substantially anhydrous liquid hydrogen fluoride, having an inlet for the liquid hydrogen fluoride and an outlet for hydrogen fluoride vapour, a feed line including a control valve and a flow meter for the liquid hydrogen fluoride for connecting a source of substantially anhydrous liquid hydrogen fluoride with the boiler inlet, a heat transfer surface within the boiler arranged to be increasingly covered by the liquid hydrogen fluoride as the level of the liquid hydrogen fluoride rises in the boiler and having dimensions related to the flow rate of liquid hydrogen fluoride so that for any given liquid flow rate within predetermined limits a liquid level will be automatically established at which heat transfer through the liquid-covered heat transfer surface is such that hydrogen fluoride will boil off at a rate equal to the liquid flow rate, and thus the metered liquid flow rate will indicate the feed rate of hydrogen fluoride vapour to the plant, and means for supplying heat to the heat transfer surface above and below the liquid level such that the evaporation rate is determined essentially only by the amount of heat transfer surface covered by the liquid, and hence by the liquid level in the boiler, said heat transfer surface and said means for supplying heat to the heat transfer surface being provided by a steam jacket and means for varying laterally the size of the heated steam jacket to vary the liquid flow limits that can be handled by the apparatus, said method comprising metering a feed of liquid hydrogen fluoride, introducing the metered feed into the boiler, supplying heat to the boiler through the heat transfer surface, and maintaining the size and location of the heat transfer surface such that liquid hydrogen fluoride is maintained in the boiler at a level partially covering said surface and the metered liquid flow rate is balanced in equilibrium by the rate of evaporation of the liquid hydrogen fluoride and any departure from said level will be automatically restored.

4. A method as claimed in claim 3 further comprising determining the required feed rate of hydrogen fluoride vapour, comparing it with the metered feed rate of liquid hydrogen fluoride, and varying the feed rate of liquid hydrogen fluoride appropriately to have it correspond with the required flow of hyrogen fluoride vapour.

* * * * *